April 29, 1947.  H. B. SMITH  2,419,737
STENOGRAPHIC TYPEWRITING MACHINE
Filed July 20, 1944
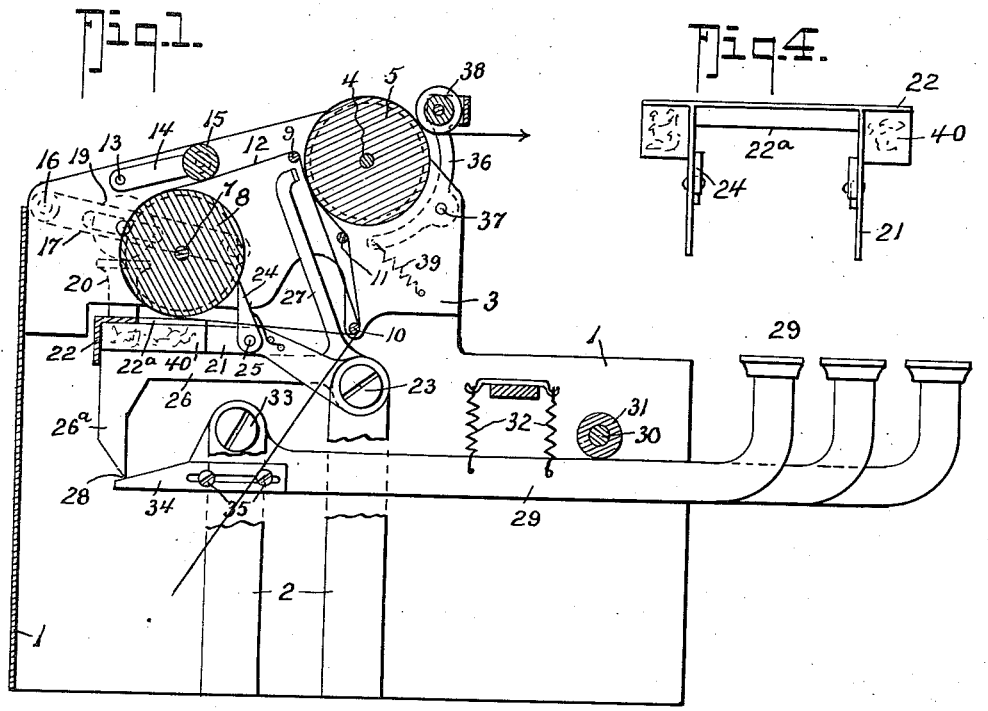
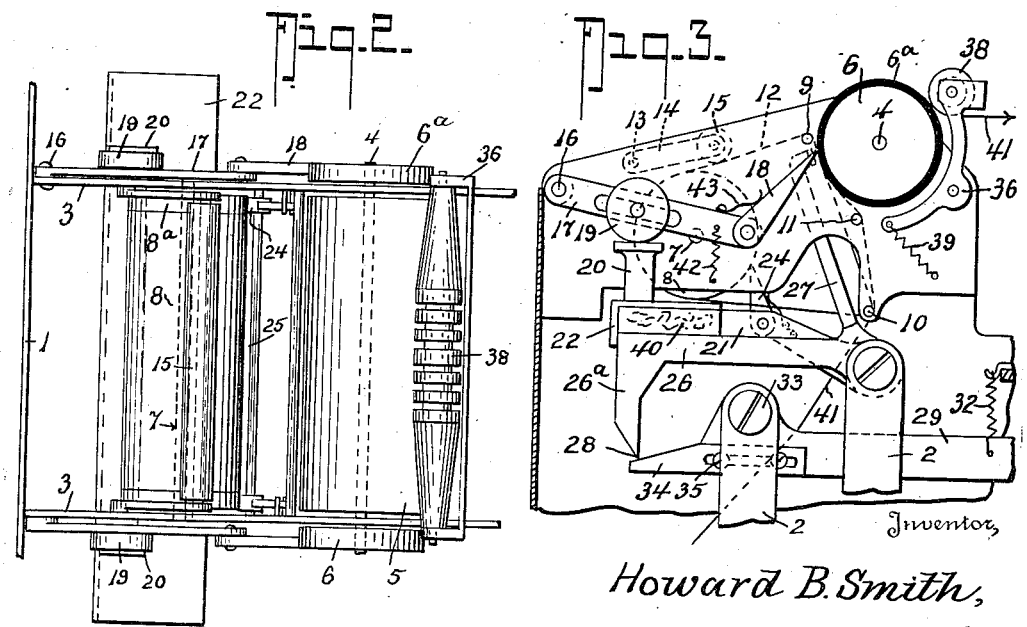
Inventor,
Howard B. Smith,
By Albert E. Dieterich,
Attorney.

Patented Apr. 29, 1947

2,419,737

UNITED STATES PATENT OFFICE 2,419,737

STENOGRAPHIC TYPEWRITING MACHINE

Howard B. Smith, Washington, D. C.

Application July 20, 1944, Serial No. 545,750

8 Claims. (Cl. 197—9)

This invention relates to typewriting machines and especially to machines of the same general character as that disclosed in my Patent Number 2,283,235, issued May 19, 1942.

My present invention has for its object to provide improvements in the construction of the typing mechanism, the platen and platen feed and the ribbon feed, designed to eliminate noise and provide a more simple mechanical structure than that of my patent aforesaid, thereby also reducing the cost of manufacture and maintenance.

Other objects will in part be obvious and in part be pointed out hereinafter.

To the attainment of the aforesaid objects and ends the invention further resides in those novel details of construction, combination and arrangement of parts all of which will be first fully described hereinafter and then be specifically pointed out in the appended claims, reference being had to the accompanying drawing in which:

Fig. 1 is a vertical cross section and part elevation illustrating my present invention.

Fig. 2 is a detail top plan view of a portion of the mechanism shown in Fig. 1.

Fig. 3 is a detail side elevation of a portion of the same.

Fig. 4 is a detail inverted plan view of the angle plate, its arms, the pawls carried thereby and the felts against which the type bar elements 26 normally rest.

In the drawing in which like numerals and letters of reference indicate like parts in all the figures, 1 and 3 represent vertical plate portions of a suitable frame structure to support the working parts of the machine and 2 represents supports for bearings for pivots 23 and 33.

The shaft 4 of a platen 5 is journalled in the plates 3 and extends through the same. On one or preferably both ends the shaft 4 carries wheels 6 having rubber or other suitable plastic tires 6ª for a purpose presently explained.

The shaft 7 of a ribbon feed roller 8 also passes through the frame plates 3 and carries on one or preferably both ends, wheels 8ª that are also tired with rubber or other suitable plastic material, the purpose of which will also presently appear.

The platen 5 and the ribbon feed roller 8 may be of any approved composition suitable for the use desired. Idler rollers 9 and 10 are provided about which and the feed roller 8 an endless ribbon 12 passes and is held closely adjacent the platen 5 by being stretched between rollers 9 and 10 by the belt tensioning roller 15 that is carried by arms 14 pivoted at 13 to the frame.

Pivoted at 16 are arms 17 which carry pawls 18 that constantly engage the plastic periphery of the wheels 6 at such an angle that when the arms 17 are raised the points of the pawls will turn the wheels 6 and consequently the platen with a step-by-step action. The plasticity of the tires 6ª allows the pawls 18 to sufficiently indent the tires to prevent the pawls from slipping where they engage the wheels. The arms 17 carry adjustably-held rollers 19 constructed preferably of rubber or other suitable sound deadening material. The rollers 19 are continuously held in contact with roller lifters 20 by gravity and light springs 42. Light springs 43 may also be provided for the pawls 18 if desired.

The roller lifters 20 are carried by and are attached to universal bar 22. The universal bar extends across the machine and over the banks of type bar arms 26 which are located at the far sides of the plates 3. The universal bar is provided with felt pads 40 over the arms 26 and is cut away as at 22ª to clear the roller and ribbon. The universal bar 22 has arms 21 which are pivoted on an axis 23 preferably coincidental with that on which the type bar arms 26 are mounted, and carry spring pressed pawls 24 pivoted at 25 that engage the plastic surfaces 8ª of the ribbon feed roller to actuate the same in step with the platen. Each arm 26 has a foot 26ª terminating in a point 28 that rests on the adjustable end 34 of a corresponding key lever 29. The type bars 27 are formed integral with the arms 26 and are bent laterally, as in my patent aforesaid, to cooperate with the platen.

The key levers 29 are pivoted at 33 and normally are held against a stop in the form of a rod 30 covered with a suitable sound deadening material 31 by springs 32. The ends 34 of the key levers 29 are slotted and adjustably held by screws 35 (see Fig. 1).

The paper 41 is taken from a suitable receptacle (not shown) and after passing over an idler roller 11 is passed about the platen 5 and held in contact with the platen by a presser roller 38 carried by a frame 36 pivoted at 37 and held in operative position by a spring or springs 39.

Upon pressing a key 29, the corresponding type bar arm 26 is raised and its type bar 27 is operated to print through the ribbon 12 on the paper web or strip 41.

The type end of the bar 27 is spaced normally a sufficient distance from the ribbon and platen so that the platen and ribbon may be advanced one step before the type strikes.

Locating the pivotal axis of the key levers to the rear of the pivotal axes of the type bars, provides increased leverage and gives a softer "touch" to the machine than otherwise.

From the foregoing description taken in connection with the accompanying drawing it is thought the construction, operation and advantages of the invention will be clear to those skilled in the art.

What I claim is:

1. In a typewriting machine wherein type bars, key levers, a platen, ribbon feeding and platen operating means are employed, the improvement which comprises: at least one key lever and one type bar, said type bar including an upwardly-rearwardly extended type carrying bar proper and a rearwardly extending arm; means for pivoting said type bar; means for pivoting said key lever on an axis located to the rear of the pivot axis of the type bar; said key lever having a rearwardly extending end and said rearwardly extending arm having means for engagement by said rearwardly extending end.

2. In a typewriting machine wherein type bars, key levers, a platen, ribbon feeding and platen operating means are employed, the improvement which comprises: a set of pivoted type bars having upwardly rearwardly extended type carrying arms and rearwardly extending arms; a corresponding set of key bars pivoted on an axis to the rear of the axis on which the type bars are pivoted and having rearwardly extending ends; and operative connections between the rear ends of the key bars and the rearwardly extending arms of the corresponding type bars.

3. In a typewriting machine wherein type bars, key levers, a platen, ribbon feeding and platen operating means are employed, the improvement which comprises: a set of pivoted type bars having upwardly extended type carrying arms and rearwardly extending arms; a corresponding set of key bars pivoted on an axis to the rear of the axis on which the type bars are pivoted and having rearwardly extending ends; and operative connections between the rear ends of the key bars and the rearwardly extending arms of the corresponding type bars, said operative connections comprising feet on said rearwardly extending arms each having a pointed end for contacting the rearwardly extending ends of the key bars.

4. In a typewriting machine wherein type bars, key levers, a platen, ribbon feeding and platen operating means are employed, the improvement which comprises: a set of pivoted type bars having upwardly directed type carrying bar portions and rearwardly extending bar portions; a corresponding set of key bars pivoted on an axis to the rear of the axis on which the type bars are pivoted and having rearwardly extending ends; and operative connections between the rear ends of the key bars and the rearwardly extending bar portions of the corresponding type bars; means for operating the platen step-by-step as a key is depressed, said means comprising at least one platen turning wheel, a pivoted arm, a platen wheel engaging pawl pivoted to said pivoted arm, a roller on said pivoted arm, a universal bar resting on the rearwardly extending bar portions of the type bars, and a roller lifter on said universal bar to engage said roller, by virtue of all of which as a key is depressed said pivotally mounted universal bar will be moved to move in turn said pivoted arm and thereby cause its pawl to advance the platen one step at a time.

5. In a typewriting machine wherein type bars, key levers, a platen, ribbon feeding and platen operating means are employed, the improvement which comprises: a set of pivoted type bars having upwardly directed type carrying bar portions and rearwardly extending bar portions; a corresponding set of key bars pivoted on an axis to the rear of the axis on which the type bars are pivoted and having rearwardly extending ends; and operative connections between the rear ends of the key bars and the rearwardly extending bar portions of the corresponding type bars; means for operating the ribbon, said means comprising a ribbon feeding roller, a pivotally mounted universal bar resting on the rearwardly extending bar portions of the type bars, at least one pawl pivoted to said universal bar and engaging a portion of said roller by virtue of which when a key is depressed said pawl will advance said ribbon feeding roller one step at a time.

6. In a typewriting machine wherein type bars, key levers, a platen, ribbon feeding and platen operating means are employed, the improvement which comprises: a set of pivoted type bars having upwardly directed type carrying bar portions and rearwardly extending bar portions; a corresponding set of key bars pivoted on an axis to the rear of the axis on which the type bars are pivoted and having rearwardly extending ends; and operative connections between the rear ends of the key bars and the rearwardly extending bar portions of the corresponding type bars; means for operating the platen step-by-step as a key is depressed, said means comprising at least one platen turning wheel, a pivoted arm, a platen wheel engaging pawl pivoted to said pivoted arm, a roller on said pivoted arm, a universal bar resting on the rearwardly extending bar portions of the type bars, and a roller lifter on said universal bar to engage said roller, by virtue of all of which as a key is depressed said pivotally mounted universal bar will be moved to move in turn said pivoted arm and thereby cause its pawl to advance the platen one step at a time; means for operating the ribbon, said means comprising a ribbon feeding roller, at least one pawl pivoted to said universal bar and engaging a portion of said roller by virtue of which when a key is depressed said pawl will advance said ribbon feeding roller one step at a time and in step with the platen.

7. In a typewriting machine wherein type bars, key levers, a platen, ribbon feeding and platen operating means are employed, the improvement which comprises: a set of pivoted type bars having upwardly rearwardly extended bar portions with type at their upper ends, said type bars also including rearwardly extending bar portions; a corresponding set of key bars pivoted on an axis to the rear of the axis on which the type bars are pivoted and having rearwardly extending ends; and operative connections between the rear ends of the key bars and the rearwardly extending bar portions of the corresponding type bars, said key bars extending forwardly of both of said axes and carrying keys at their forward ends.

8. In a typewriting machine wherein type bars, key levers, a platen, ribbon feeding and platen operating means are employed, the improvement which comprises: at least one key lever and one type bar, said type bar comprising a bell crank one leg of which carries the type and extends upwardly and the other leg of which has a foot terminating in a pointed end; means for pivotally mounting said bell crank; means for pivotally mounting said key lever on an axis located to the rear of the pivotal axis of the type bar, said key lever having its rear portion downwardly-rearwardly inclined and said pointed end contacting said downwardly inclined portion of the key lever.

HOWARD B. SMITH.

REFERENCES CITED

The following references are of record in the file of this patent:

UNITED STATES PATENTS

| Number | Name | Date |
|---|---|---|
| 1,293,739 | Edwards | Feb. 11, 1919 |
| 1,954,834 | Smith | Apr. 17, 1934 |
| 2,283,235 | Smith | May 19, 1942 |
| 1,802,921 | Low-Vogel | Apr. 28, 1931 |
| 1,600,088 | Burstyn | Sept. 14, 1926 |
| 1,204,929 | Ball | Nov. 14, 1916 |
| 1,280,743 | Ireland | Oct. 8, 1918 |
| 2,319,273 | Sterling | May 18, 1943 |

FOREIGN PATENTS

| Number | Country | Date |
|---|---|---|
| 9,335 | French | 1908 |